United States Patent [19]
Giacosa

[11] 3,939,732
[45] Feb. 24, 1976

[54] POWER UNIT FOR VEHICLES INCORPORATING AN AUTOMATIC STEPLESS SPEED CHANGE GEAR

[75] Inventor: Dante Giacosa, Turin, Italy

[73] Assignee: Sira Societa Industriale Richerche Automotoristiche, Turin, Italy

[22] Filed: May 2, 1974

[21] Appl. No.: 466,338

[30] Foreign Application Priority Data
May 10, 1973 Italy .................................. 68333/73
Jan. 8, 1974 Italy .................................. 67027/74

[52] U.S. Cl. ............ 74/701; 74/217 R; 74/217 CV; 74/230.17 M; 74/740; 180/42; 180/54 F
[51] Int. Cl... F16h 37/08; F16h 55/52; B60k 17/34
[58] Field of Search ............ 74/700, 701, 695, 694, 74/740, 230.16, 230.17 E, 230.17 M, 217 R, 217 CV, 336 B, 785, 640; 180/54 F, 42

[56] References Cited
UNITED STATES PATENTS

| | | | |
|---|---|---|---|
| 1,093,277 | 4/1914 | Leggett | 74/700 X |
| 1,880,270 | 10/1932 | Noble | 74/700 X |
| 2,678,566 | 5/1954 | Oehrli | 74/230.17 M |
| 3,603,296 | 9/1971 | Mitchell | 123/195 A |

*Primary Examiner*—Benjamin W. Wyche
*Assistant Examiner*—Lance W. Chandler
*Attorney, Agent, or Firm*—Sughrue, Rothwell, Mion & Zinn

[57] ABSTRACT

A vehicle power engine having an overhead camshaft transmits drive to front wheels through a stepless automatic speed change gear of the belt and pulley type, drive being transmitted from the crankshaft to the drive pulley of the speed change gear through a drive shaft extending through a central longitudinal cavity in the camshaft. The front-mounted engine may be located longitudinally or transversely with respect to the longitudinal axis of the vehicle.

3 Claims, 6 Drawing Figures

POWER UNIT FOR VEHICLES INCORPORATING AN AUTOMATIC STEPLESS SPEED CHANGE GEAR

BACKGROUND OF THE INVENTION

This invention concerns vehicular power units of the type comprising an overhead camshaft internal combustion engine and an automatic stepless speed change gear which has at least one pair of expansible pulleys connected by a belt.

The arrangement of the components of the power unit takes up a considerable amount of available space on the vehicle. If the engine is situated in the front and drive is transmitted to the rear wheels, then there are no difficulties. If, on the other hand, front wheel drive is required from a front-mounted engine the available space for the speed change gear is limited and the layout of the power unit system becomes very difficult. This difficulty results in the main from the fact that in stepless gear changes of the aforesaid type a limit has to be imposed upon the distance between the driving and the driven pulley, so as not to induce excessive heating of the belt.

An object of the present invention is to avoid the aforementioned disadvantage by providing a power unit of the above mentioned type, in which the components of the unit are so arranged as to take up minimal space in the vehicle, making the greatest use of the available space in the vehicle engine compartment, so as to allow the engine and the power unit to be installed in the front of the vehicle for front wheel drive.

SUMMARY OF THE INVENTION

According to the present invention there is provided a vehicular power unit of the type comprising an internal combustion engine with an overhead camshaft and an automatic stepless speed change gear which comprises at least one pair of expansible pulleys connected by a belt, characterised in that the means for transmitting the power from the engine crankshaft to the driving pulley of the or each speed change gear comprise an intermediate drive shaft extending within a longitudinal axial cavity within the camshaft of the engine, the said intermediate drive shaft being driven from the engine at one end and being operatively connected at its other end to the drive pulley or pulleys of the speed change gear.

BRIEF DESCRIPTION OF THE DRAWINGS

The invention will now be further described, by way of non-limiting example, with reference to the attached drawings, wherein.

DETAILED DESCRIPTION WITH REFERENCE TO THE DRAWINGS

Figure 1:
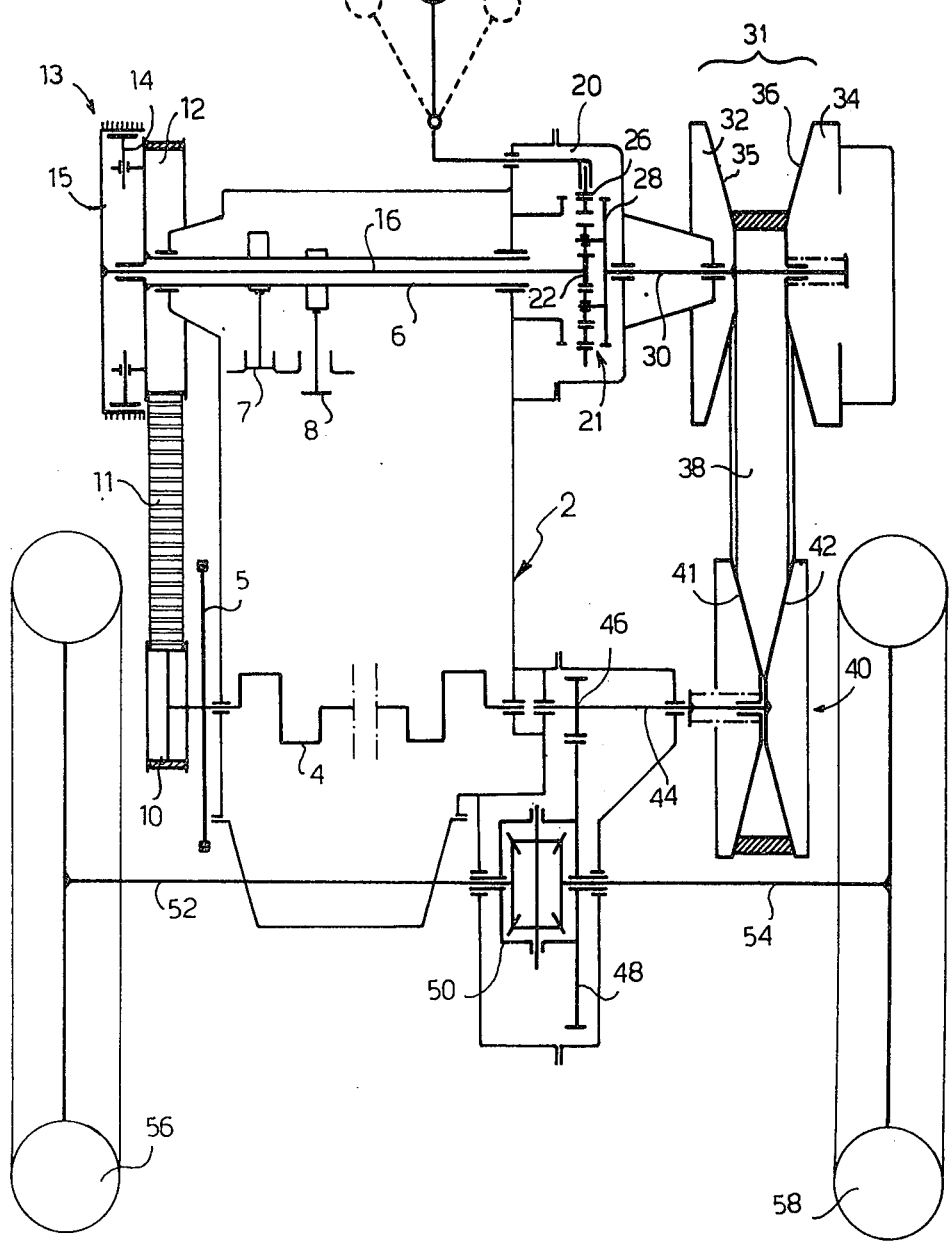
FIG. 1 is a diagrammatic cross section of a vehicular power unit for vehicles according to one embodiment of the invention.
Figure 2:
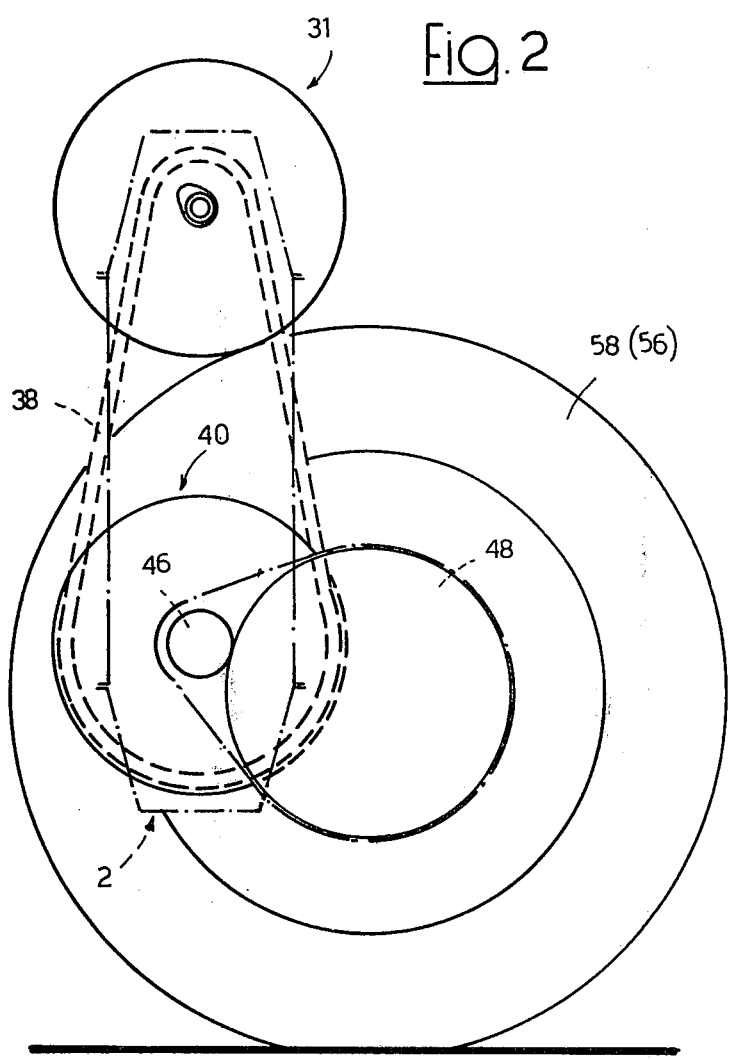
FIG. 2 is a diagrammatic side elevational view of the power unit.

FIGS. 1 and 2 illustrate a power unit for vehicles which comprises a vertically elongated internal combustion engine 2 installed transversely to the longitudinal axis of the vehicle. The engine 2 has a timing system including an overhead a camshaft 6 for operating the inlet and exhaust valves 7, 8 associated with each cylinder of the engine, the camshaft 6 being driven from the crankshaft 4 of the engine through a toothed endless belt 11 which is driven by a toothed pulley 10 mounted on one end of the crankshaft 4 adjacent a flywheel 5. The toothed belt 11 drives a toothed pulley 12 keyed to the corresponding end of the camshaft 6.

The camshaft 6 is hollow, and houses within its central axial cavity an intermediate drive shaft 16, which is driven from one end by the pulley 12 and in turn drives an expansible driving pulley 31 having movable side walls and forming part of a stepless speed change gear of the belt type.

The toothed pulley 12 keyed on to the camshaft 6 supports radially movable centrifugal elements 14 of a friction clutch 13 having a drum 15 which is keyed to the adjacent end of the drive shaft 16. The drive shaft 16 carries at its end opposite the clutch 13 a wheel 22 of a reversing device 21 of the epicyclic type. The reversing device 21 comprises a planet carrier 28 attached to an output shaft 30, axially aligned with the drive shaft 16 and projecting from one end of the engine. The reversing device 21 further includes a ring 26 controlled by a manual lever 24 so as to select, according to the position of the said lever 24, forward drive, reverse drive, or neutral (that is, the engine out of gear). Connected to the output shaft 30 of the reversing device 21 is an expansible driving pulley 31 which has two axially displaceable side walls 32 and 34 with frusto-conical bevel faces 35 and 36 facing each other. The pulley 31 is attached by means of a V-section endless belt 38 to a similar expansible driven pulley 40, with axially movable side walls 41, 42, keyed on to a shaft 44 parallel to the shaft 30 and disposed in axial alignment with the engine crankshaft 4, but independent of the latter. On to the shaft 44 of the driven pulley 40 there is keyed a cylindrical spur gear 46 engaging with a gear wheel 48 which in turn transmits drive through a differential 50 to a pair of drive shafts 52, 54 which are connected to front drive wheels 56 and 58 of the vehicle.

The expansion of the driving pulley 31 of the speed change gear is controlled by known means as a function of the speed of rotation of the drive shaft 16, which in turn is dependent upon the speed of rotation of the engine 2 and upon the induction manifold pressure of the engine 2. Movememt of the side walls 32 and 34 of the driving pulley 31 towards or away from each other induces corresponding movements, in opposite directions, of the movable side walls 41, 42 of the driven pulley 40 so that drive is transmitted from the pulley 31 to the pulley 40 with a steplessly variable gear ratio.

The arrangement of the intermediate drive shaft 16 within the camshaft 6 and hence within the engine 2 makes it possible to keep the center-to-center distance between the two pulleys 31 and 40 sufficiently small to allow satisfactory functioning of the belt 38.

It will be appreciated that since transmission of the engine power to the wheels 56 and 58 passes via the toothed belt 11, the latter, as well as the toothed pulleys 10 and 12, must be of suitable dimensions.

This power unit of the present invention is therefore very compact and can be easily installed in a front engine compartment of a motor vehicle.

Figure 3:
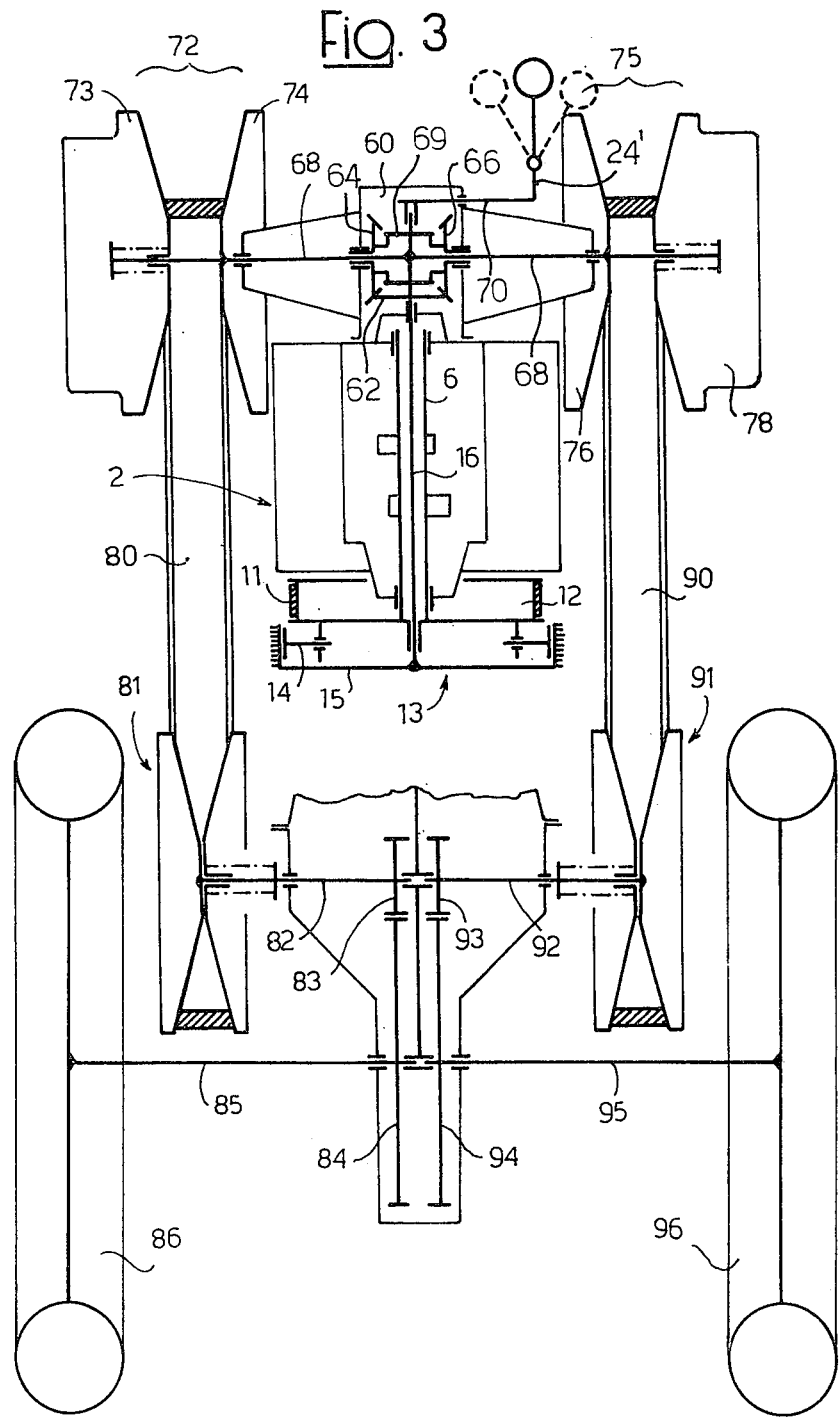
FIG. 3 is a diagrammatic longitudinal section, taken in a horizontal plane, of a power unit according to a first variant of the embodiment of FIGS. 1 and 2.
Figure 4:
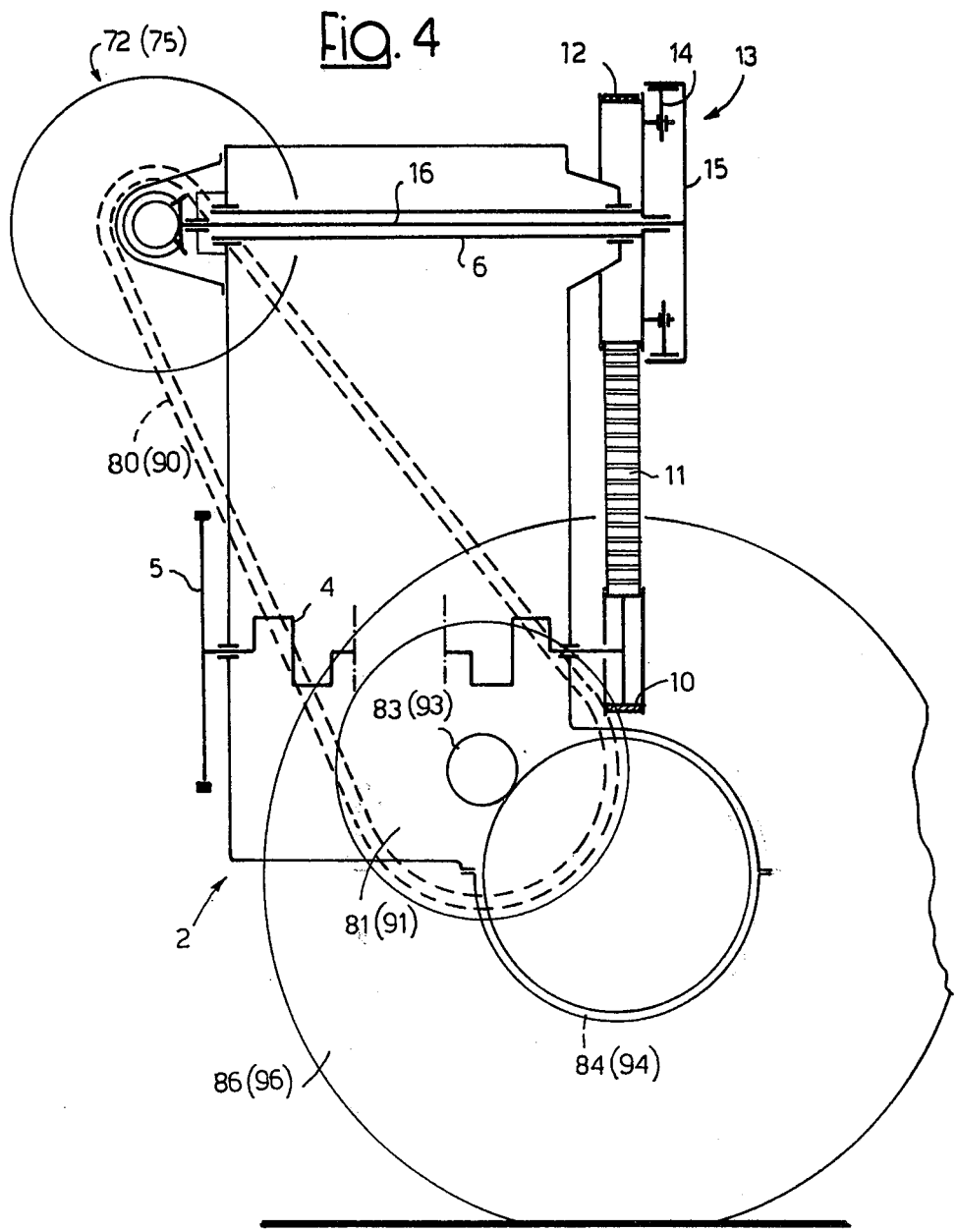
FIG. 4 is a diagrammatic longitudinal section, taken in a vertical plane, of the unit illustrated in FIG. 3.

In FIGS. 3 and 4 there is shown a vehicular power unit according to a variant of the invention in which the internal combustion engine 2 is mounted with its crankshaft 4 extending longitudinally in a front compartment of the vehicle and drive is transmitted to the front wheels 86, 96. In this case, also, the engine camshaft 6 is hollow, and within its central axial cavity there is housed an intermediate drive shaft 16 which receives drive from a toothed driven pulley 12 coupled to the camshaft 6 by means of a centrifugal friction clutch 13. The opposite end of the intermediate drive shaft 16 carries a bevel pinion 62 of a reversing device 60. The bevel pinion 62 meshes with two toothed pinions 64, 66 freely rotatable upon a transverse shaft 68, to the opposite ends of which are keyed two expansible driving pulleys 72, 75 of two stepless speed change gears of the belt type.

The two idle pinions 64, 66 can be coupled selectively to the shaft 68, which has a splined central portion, by means of a sliding sleeve 69 movable axially relative to the shaft 68 by a linkage 70 connected to a manual selector lever 24. In this way it is possible to select forward or reverse drive or gear disengagement (neutral). Each of the two expansible driving pulleys 72, 75 consists, as in the previously described embodiment, of frusto-conical movable side walls 73 and 74, 76 and 78 connected by respective V-belts 80, 90 to respective expansible driven pulleys 81, 91. The two said driven pulleys 81, 91 are mounted upon two coaxial shafts 82, 92, independent of one another, which are connected through reduction gearing 83, 84, 93, 94 to the respective drive shafts 85, 95 of the two front drive wheels 86, 96. By this arrangement it is therefore possible to dispense with a differential gear, since the two speed changes are self-regulating in operation. This system allows the vehicle to be driven with only one belt in the event of the other belt failing by breaking.

Figure 5:
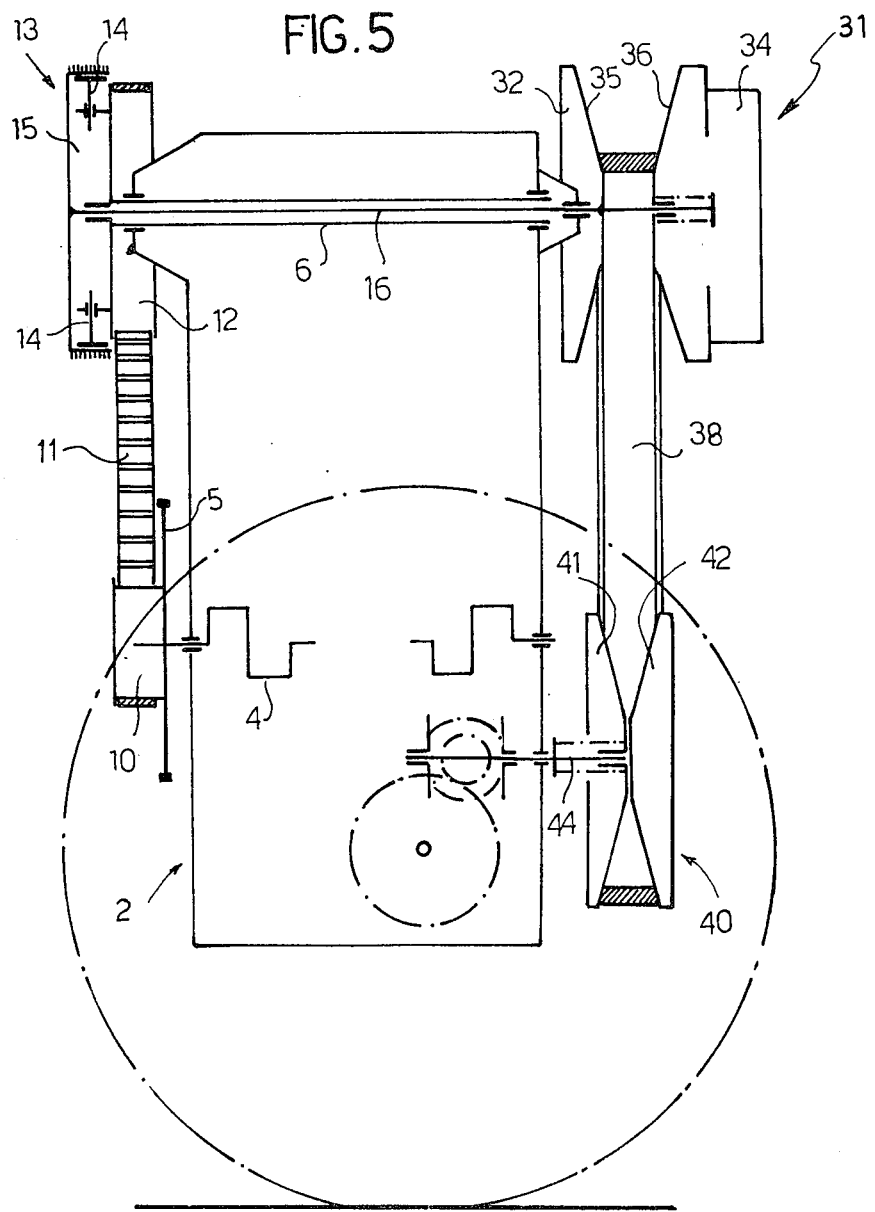
FIG. 5 is a diagrammatic longitudinal section, taken in a vertical plane, of a power unit according to another variant.
Figure 6:
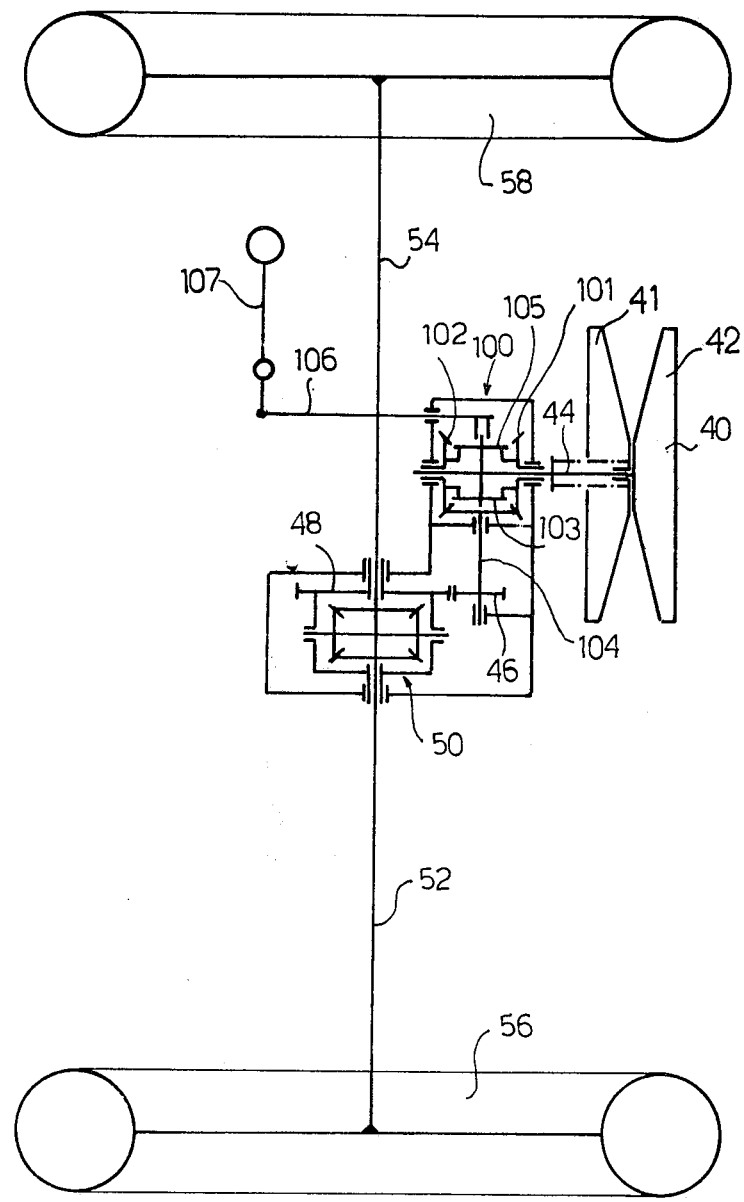
FIG. 6 is a diagrammatic plan view of the driven pulley of the stepless speed change gear and of the transmission elements disposed downstream of the said pulley in the unit shown in FIG. 5.

In FIGS. 5 and 6 there is illustrated a power unit according to another variant of the invention.

The engine camshaft 6 is hollow and houses in its central axial cavity an intermediate drive shaft 16 to which drive is transmitted at one end from a pulley 12 coupled to the camshaft 6. The opposite end of the drive shaft 16 is coupled to an expansible drive pulley 31, with movable side walls, of a stepless speed change gear of the belt type.

The drive pulley 31 of the change gear consists of two axially movable side walls 32 and 34 having frusto-conical bevel faces 35 and 36 between which a V-belt 36 is located. The belt 36 transmits drive to an expansible driven pulley 40 with axially movable side walls 41, 42 connected to a shaft 44 parallel to the drive shaft 16 and located beneath the engine crankshaft 4.

The shaft 44 is coupled to a reversing device 100 which comprises two toothed pinions 101, 102 mounted idly upon the shaft 44 and meshing with a bevel pinion 103 coupled to a shaft 104 which is disposed at right angles to the input shaft 44. On to the shaft 104 there is keyed a spur gear 46 which meshes with a gear wheel 48 which in turn transmits drive, with the interposition of a differential system 50, to a pair of axle shafts 52 and 54 connected to respective front driving wheels 56, 58 of the vehicle.

The two toothed pinions 101, 102 of the reversing device 100 can be coupled selectively to the shaft 44, which has a splined central portion, by means of a sliding sleeve 105, driven by a linkage 106 connected to a manual selector lever 107. In this way it is possible to effect selectively disconnection of the drive (neutral setting of the lever 107) or forward or reverse drive, by respectively connecting to the shaft 44 neither, or different ones, of the two pinions 101 or 102.

It will be apparent that the overall dimensions of the unit described may be further reduced if the reversing device 100 is situated in a position alongside the engine and not on an extension of the engine.

Although the embodiment of FIGS. 5 and 6 relates to an engine mounted with its crankshaft disposed in the longitudinal direction of the vehicle, this unit, like that of FIGS. 1 and 2, could be adapted to engines mounted transversely, for example by substituting for the gears 46, 48 a pair of bevel gears.

I claim:

1. Vehicular power unit for a motorized vehicle having an internal combustion engine having a crankshaft and an overhead camshaft, and an automatic stepless speed change gear having at least one expansible driving pulley connected to the engine and driven thereby, at least one expansible driven pulley, and a belt connecting said driving and driven pulleys, wherein the improvements comprise said camshaft is hollow and has a central longitudinal axial cavity; an intermediate drive shaft extending within said longitudinal axial cavity within said camshaft; toothed belt transmission means drivingly connecting one end of said intermediate drive shaft to said engine; a centrifugal friction clutch coupling said intermediate drive shaft to said toothed belt transmission, said centrifugal friction clutch having centrifugal elements which are carried by a toothed pulley of said toothed belt transmission and a drum which is connected to the adjacent end of said intermediate drive shaft; and means operatively connecting the other end of said drive shaft to said at least one driving pulley of the speed change gear.

2. Vehicular power unit for a motorized vehicle having an internal combustion engine having a crankshaft and an overhead camshaft, and an automatic stepless speed change gear having at least one expansible driving pulley connected to the engine and driven thereby, at least one expansible driven pulley, and a belt connecting said driving and driven pulleys, wherein the improvements comprise said camshaft is hollow and has a central longitudinal axial cavity; an intermediate drive shaft extending within said longitudinal axial cavity within said camshaft; first means drivingly connecting one end of said intermediate drive shaft to said engine; and second means operatively connecting the other end of said drive shaft to said at least one driving pulley of speed change gear, wherein the stepless speed change gear is provided with a single driving pulley situated upon the same axis as the intermediate drive shaft and including a reversing device connecting said driving pulley to said drive shaft.

3. The power unit defined in claim 2, wherein the crankshaft of the internal combustion engine is disposed crosswise in relation to the longitudinal axis of the vehicle and wherein the center-to-center distance between driving and driven pulleys of the speed change gear is at least equal to the inter-axis distance between the camshaft and the crankshaft of the engine.

* * * * *